United States Patent
Rule

[19]

[11] Patent Number: 5,855,942
[45] Date of Patent: Jan. 5, 1999

[54] METHOD TO RETAIN CARBONATION IN CARBONATED BEVERAGES AND COMPOSITION THEREFOR

[75] Inventor: Mark Rule, Atlanta, Ga.

[73] Assignee: The Coca-Cola Company, Atlanta, Ga.

[21] Appl. No.: 951,514

[22] Filed: Oct. 16, 1997

[51] Int. Cl.⁶ .............................. B65B 55/00; C12G 1/06; A23L 2/40
[52] U.S. Cl. .......................... 426/395; 426/397; 426/477; 426/561; 426/590
[58] Field of Search ................................... 426/561, 590, 426/477, 395, 397

[56] References Cited

U.S. PATENT DOCUMENTS 3,441,417 4/1969 Feldman et al. .............................. 99/79
4,082,854 4/1978 Yamada et al. ......................... 426/106
5,378,485 1/1995 Mahler et al. ............................ 426/329

FOREIGN PATENT DOCUMENTS 970376 9/1964 Br. Indian Ocean Ter. .

*Primary Examiner*—Nina Bhat
*Attorney, Agent, or Firm*—Birch, Stewart, Kolasch & Birch, LLP

[57] ABSTRACT

A method and composition for enhancing retention of carbon dioxide in carbonated bottled beverages indicates the addition of a carbonic acid ester such as propylene carbonate, 1,3-butylene carbonate, diethyl carbonate, neopentylene carbonate and propylene carbonate or mixtures thereof. The carbonic acid ester in the aqueous medium of the beverage undergoes slow hydrolysis thereby releasing $CO_2$ to maintain the $CO_2$ level in the container.

35 Claims, 1 Drawing Sheet

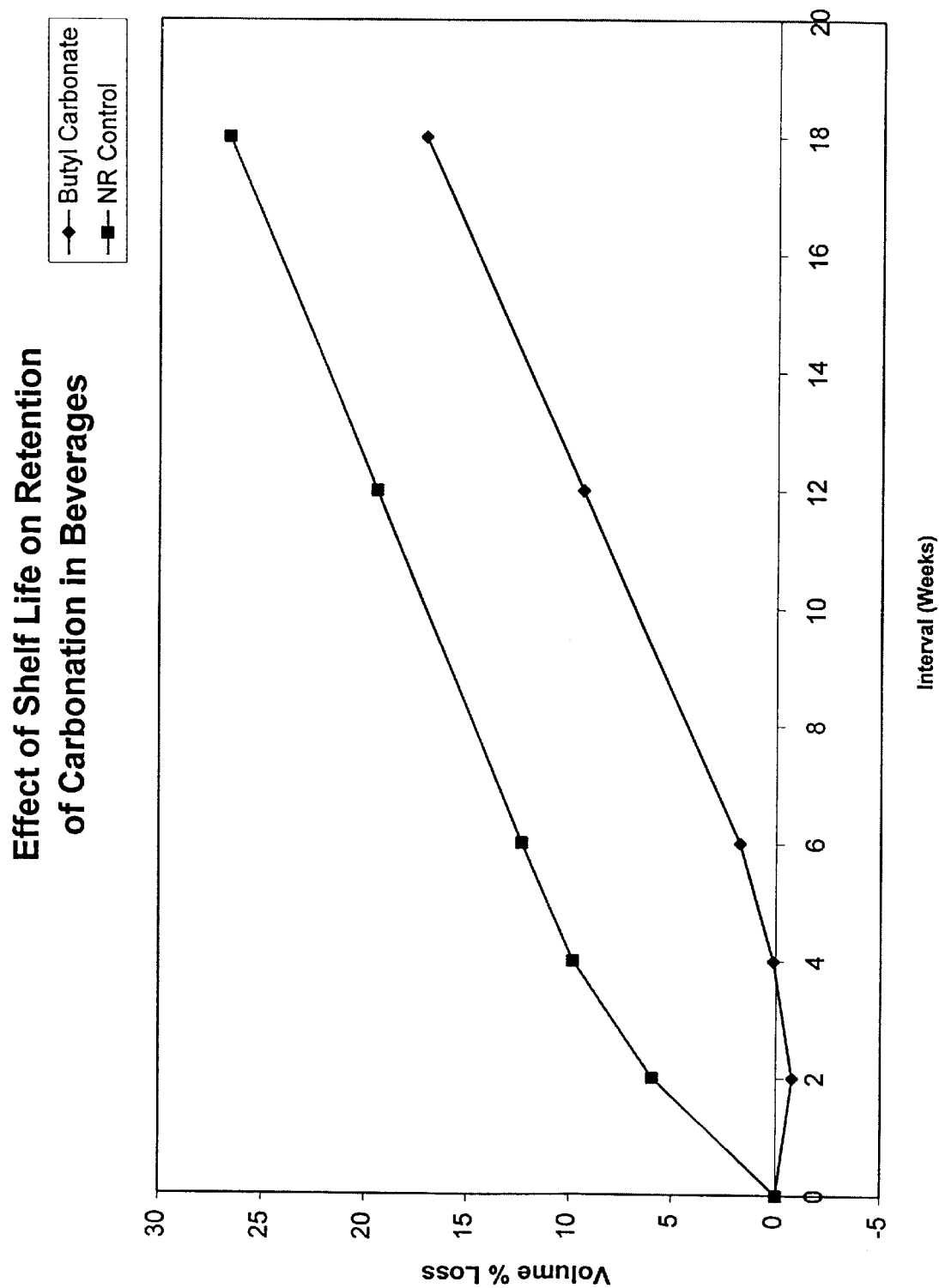

METHOD TO RETAIN CARBONATION IN CARBONATED BEVERAGES AND COMPOSITION THEREFOR

BACKGROUND OF THE INVENTION

This invention relates to a method of retention of carbonation in beverages in containers and more particularly, plastic containers made of polyethylene terephthalate (PET) or poly(ethylene naphthalate) (PEN) by adding a carbonic acid ester to the beverage. The present invention further relates to a composition for maintaining the desired level of carbonation in a container.

Plastic and metal containers have been replacing glass in bottling beverages where easy handling, low weight and non-breakability are needed. However, in the case of carbonated beverages in plastic containers such as PET, there is a loss of $CO_2$ through the walls of the container and carbonation is not retained. Once a carbonated beverage product loses too much carbonation (e.g. 17.5%), it is unacceptable to sell to a consumer. A carbonated beverage as used herein is an aqueous solution having a pH in the range of about 2 to 4, and preferably of about 3, in which carbon dioxide gas in the range of 2 to 5 vol $CO_2$/vol $H_2O$, preferably 3.3 to 4.2 vol $CO_2$/vol $H_2O$ has been dissolved. Flavor and sweeteners may also be added.

British Patent Specification 970,376 to Kaiser discloses a beverage with an added bactericide which decomposes to form $CO_2$ and alcohol which are compatible with the beverage. A suitable bactericide is pyrocarbonic acid diethylester which hydrolyzes completely in an aqueous solution to form ethyl alcohol and carbonic acid. Beverages treated with the bactericide exhibit extended shelf life. However, the rate of release of carbon dioxide is very rapid relative to the shelf-life of the beverage. Therefore, use of these agents in carbonated beverages result in a rate of carbon dioxide release substantially greater than the rate of carbon dioxide loss via permeation, and result in a pressure rise in the containers above the acceptable levels required for high quality product.

U.S. Pat. No. 3,441,417 to Feldman et al. discloses a dry beverage composition adapted to be reconstituted with water to form an effervescent beverage. An essential carbonating ingredient of the composition is an organic compound having a carbonic acid anhydride group capable of controlled hydrolysis in water to release $CO_2$ over a period of 30 seconds to 3 minutes.

It is therefore the object of this invention to add a carbonating agent to the carbonated beverage that undergoes slow hydrolysis in the acidic aqueous medium and releases the $CO_2$ to constantly replenish $CO_2$ that is lost through the walls or top of the container (e.g. plastic container), thereby extending the shelf life of the beverage.

SUMMARY OF THE INVENTION

This invention relates to a method for retention of carbon dioxide in carbonated beverages having an aqueous medium in a container comprising blending a carbonic acid ester with the beverage ingredients. The carbonic acid ester undergoes hydrolysis in the acidic aqueous medium to produce gaseous $CO_2$ that constantly replenishes $CO_2$ lost from the beverage through the walls or sealed top of the container.

The present invention further relates to a composition for maintaining carbon dioxide gas in an aqueous carbonated beverage in a container, comprising a carbonic acid ester and said aqueous carbonated beverage, said carbonic acid ester being present in an effective amount for producing gaseous $CO_2$ by hydrolysis of said carbonic acid ester, said carbonic acid ester being present in an amount sufficient that rate of $CO_2$ produced by hydrolysis is approximately the same as the rate of loss through said container.

Suitable carbonic acid esters include 1,3-butylene carbonate, diethyl carbonate, neopentylene carbonate and propylene carbonate or mixtures thereof. The amount of carbonic acid ester added to the beverage is dependent on the amount of carbon dioxide release that is desired. The preferred amount of carbonic acid ester is within the range of about 0.1 grams per liter to about 20 grams per liter, preferably from about 2 grams per liter to about 5 grams per liter.

BRIEF DESCRIPTION OF THE DRAWING

The attached FIGURE is a graph illustrating how the use of carbonic acid esters decrease the loss of $CO_2$ in a bottled beverage as a function of time compared to a beverage without the carbonic ester.

DETAILED DESCRIPTION OF THE INVENTION

The present invention relates to a method for retention of carbonation in beverages by adding a suitable carbonic acid ester to the beverage prior to putting the beverage in a container, such as a plastic container. Suitable carbonic acid esters undergo slow hydrolysis in the aqueous medium of the beverage and release carbon dioxide and food approved alcohol or glycols that are compatible with the beverage. Therefore, with the addition of these carbonic acid esters, the shelf-life of the carbonated beverage in a container, particularly a plastic container, can be extended by the constant replenishment of the carbon dioxide lost through the walls or sealed top of the container.

Any suitable plastic used for packaging carbonated soft drinks may be used for making the container. Also, the invention is applicable to containers comprised of materials other than plastic (e.g. glass) if the package leaks carbon dioxide, for instance, through a plastic cap. Suitable plastics are well known in the art and the invention is not limited to any specific type of plastic. Examples of known plastic materials include polyethylene terephthalate (PET) homopolymers or copolymers, or poly(ethylene naphthalate) (PEN) homopolymers or copolymers. The present invention is further applicable to the plastic containers disclosed in copending application Ser. No. 08/681,469 filed on Jul. 23, 1996, which is herein incorporated by reference.

Carbonic acid esters that are useful in the present invention include 1,3-butylene carbonate, diethyl carbonate, neopentylene carbonate and propylene carbonate or mixtures thereof.

The amount and type of carbonic acid ester chosen is based on the rate of carbon dioxide loss through the walls of the container and the extent of shelf-life enhancement desired, and is further chosen to be compatible with the beverage components. For containers that lose carbon dioxide very slowly, a carbonic acid ester that releases carbon dioxide very slowly is preferred. One example of such a slow-release carbonic acid ester is propylene carbonate. For containers that lose carbon dioxide more rapidly, a carbonic acid ester with a faster rate of carbon dioxide release is desirable. For non-returnable poly(ethylene terephthalate) containers, the preferred carbonic acid ester is 1,3-butylene carbonate.

A protocol for selecting a suitable carbonic acid ester and the amount thereof is as follows. The size of a container (e.g. 1 liter), the material comprising the container (e.g. PET or PEN) and the thickness of the walls (e.g. 5 to 20 mils) are selected. A carbonated beverage, which is defined as an aqueous solution having a pH in the range of about 2 to 4 in which carbon dioxide gas in the range of 2 to 5 vol $CO_2$/vol $H_2O$ has been dissolved, is placed up to the neck portion of the container. Flavor and sweeteners may also be added. The rate of $CO_2$ loss is then measured by measuring the pressure loss over time using the Zahm-Nagle test. Next, the rate of hydrolysis of selected carbonic acid esters is measured at the beverage pH and the temperature of interest (e.g. room temperature) by measuring the rate of $CO_2$ formation for each carbonic acid ester. The amount of desired carbonic acid ester and type of carbonic acid ester may then be selected to a rate of $CO_2$ release approximately equal to the rate of $CO_2$ loss from the selected package.

The length of the desired shelf life may be arbitrarily selected, but from a practical point of view a typical shelf life of a carbonated beverage on the shelf of a store is about 15 weeks. The present invention improves the shelf life by about one third, and preferably, the present invention doubles the shelf life of the product.

As discussed above, an object of this invention is to add a carbonating agent to the carbonated beverage that undergoes slow hydrolysis in the acidic aqueous medium and releases $CO_2$ to constantly replenish $CO_2$ to the beverage, replacing the $CO_2$ that is lost through the walls or cap of the container and thereby extending the shelf life of the beverage without causing the pressure in the container to rise significantly. The term "significantly" means that the pressure does not rise in the container more than about 5%. In order to avoid a significant pressure rise (e.g. greater than about 5%), the selected carbonic acid ester preferably should take about one-half of the package shelf-life to undergo 95% hydrolysis. In other words, the amount of carbonic acid ester which is blended with beverage maintains the predetermined amount of carbon dioxide gas in the container for a period which is about 33% longer, and more preferably 50% longer than if the carbonic acid ester was not present. Thus, the term "slow" as used herein refers to a reaction that occurs over a term of many weeks (e.g. 3 to 30 weeks).

The reaction of the invention is controlled by pH, which is preferably maintained in the range of 2 to 4, and most preferably at about 3. Thus, given this protocol, it should be routine to select a suitable carbonic acid ester to obtain the desired rate of $CO_2$ in the bottle. That is, given a specific composition of a beverage, material of bottle, thickness of bottle, pH and temperature, the selection of a suitable carbonic acid ester and amount thereof is readily determined.

The preferred amount of carbonic acid ester added to the beverage is within the range of about 0.1 grams per liter to about 20 grams per liter, preferably within the range of about 2 grams per liter to about 5 grams per liter.

Accordingly, the present invention relates to a method for maintaining a predetermined amount of carbon dioxide gas in an aqueous carbonated beverage in a container, said container having walls and a top opening for removing the carbonated beverage, said method comprising the step of blending an effective amount of a carbonic acid ester with said aqueous carbonated beverage, wherein the hydrolysis of the carbonic acid ester constantly replenishes $CO_2$ loss from said container and at approximately the same rate of loss from the aqueous carbonated beverage through the walls or top of the sealed container.

The invention will now be described more fully by reference to the following specific examples:

EXAMPLE 1

An aqueous carbonated beverage having a pH of 3 and a $CO_2$ concentration of 4 vol $CO_2$/vol $H_2O$ is added to a 1 liter non-returnable PET bottle obtained from Southeastern Container, Enka N.C., and identified as "NR control". The bottle weighed 36 grams and had a sidewall thickness of 13 mil. After a period of 65–70 days at 22° C., this bottle lost 17.5% carbonation as measured by the Zahm-Nagle test.

EXAMPLE 2

The same type of carbonated beverage as used for Example 1 and containing 3.6 grams per liter of 1,3-butylene carbonate was added to the same type of PET-bottle used in Example 1 and identified as "1,3-butylene carbonate". After a period of approximately 120 days at 22° C., this bottle lost approximately 17.1% carbonation as measured by the Zahm-Nagle test.

EXAMPLE 3

Example 1 is repeated using a refillable poly(ethylene naphthalate) bottle. The bottle weighed 36 grams and had a sidewall thickness of 13 mil. In this example, a loss of 10% of carbon dioxide is observed after 27 weeks as measured by the Zahm-Nagle test.

EXAMPLE 4

Example 3 is repeated with the carbonated beverage containing 12 grams per liter of propylene carbonate. In this example, the loss of 10% of the carbon dioxide is observed to require 56 weeks. These results compared to Example 3 clearly show that the addition of propylene carbonate extends the shelf-life of a carbonated beverage in a refillable poly(ethylene naphthalate) bottle by about 29 weeks.

The following table summarizes the data in the attached FIGURE:

| | Volume % Loss of $CO_2$ | |
|---|---|---|
| Time (weeks) | 1-L NR PET (%) | 1-L NR PET (*) |
| 0 | 0 | 0 |
| 2 | 5.96 | −0.78 |
| 4 | 9.83 | 0.12 |
| 6 | 12.31 | 1.74 |
| 12 | 19.45 | 9.38 |
| 18 | 26.65 | 17.10 |

(*) 3.6 grams of 1,3 butylene carbonate

The FIGURE illustrates the shelf-life of the two (2) bottled carbonated beverages of Examples 1 and 2 as a function of the volume loss (%) of carbon dioxide versus time (days). The results in the FIGURE show that the carbonated beverage in a typical non-returnable PET plastic bottle (NR Control) reaches 17.5% loss of $CO_2$ after approximately 65 to 70 days. The carbonated beverage containing 1,3-butylene carbonate in a typical non-returnable plastic bottle (1,3-butylene carbonate) looses approximately 17.1% carbonation over a period of approximately 120 days. These results clearly show that the addition of a carbonic acid ester in accordance with the present invention extends the shelf-life of the carbonated beverage in a non-returnable PET bottle past 120 days and does not result in an increase in pressure greater than 5% over the initial pressure.

Having thus shown and described what is at present considered to be the preferred embodiment of the invention, it should be noted that all modifications, alterations and changes coming within the spirit and scope of the invention as set forth in the appended claims are herein meant to be included.

I claim:

1. A method for maintaining carbon dioxide gas in an aqueous carbonated beverage in a container, said method comprising the step of blending an effective amount of a carbonic acid ester with said aqueous carbonated beverage for producing gaseous $CO_2$ by hydrolysis of said carbonic acid ester, said carbonic acid ester being present in an amount sufficient to replenish $CO_2$ loss from said container at approximately the same rate of loss from said container.

2. The method of claim 1, wherein said carbonic acid ester is selected from the group consisting of 1,3-butylene carbonate, diethyl carbonate, neopenthylene carbonate and propylene carbonate and mixtures thereof.

3. The method of claim 1, wherein said carbonic acid ester comprises 1,3-butylene carbonate.

4. The method of claim 1, wherein said carbonic acid ester comprises diethyl carbonate.

5. The method of claim 1, wherein said carbonic acid ester comprises neopentylene carbonate.

6. The method of claim 1, wherein said carbonic acid ester comprises propylene carbonate.

7. The method of claim 1, wherein the amount of carbonic acid ester is about 0.1 grams per liter to about 20 grams per liter.

8. The method of claim 7, wherein the amount of carbonic acid ester is about 2 grams per liter to about 5 grams per liter.

9. The method of claim 1, wherein the container comprises polyethylene terephthalate.

10. The method of claim 1, wherein the container comprises poly(ethylene naphthalate).

11. The method of claim 1, wherein the amount of carbon dioxide gas in the aqueous carbonated beverage is in the range of 2 to 5 vol $CO_2$/vol $H_2O$.

12. The method of claim 11, wherein the predetermined amount of carbon dioxide gas in the aqueous carbonated beverage is in the range of 3.3. to 4.2 vol $CO_2$/vol $H_2O$.

13. The method of claim 1, wherein the carbonated beverage is an aqueous solution having a pH in the range of about 2 to 4.

14. The method of claim 13, wherein the carbonated beverage is an aqueous solution having a pH of about 3.

15. The method of claim 1, wherein the amount of carbonic acid ester which is blended with said beverage does not increase the pressure in the container by more than about 5%.

16. The method of claim 1, wherein the amount of carbonic acid ester which is blended with said beverage maintains the predetermined amount of carbon dioxide gas in the container for a period which is about 50% longer than if said carbonic acid ester was not present.

17. The method of claim 1, wherein the amount of carbonic acid ester which is blended with said beverage maintains the predetermined amount of carbon dioxide gas in the container for a period which is about 33% longer than if said carbonic acid ester was not present.

18. The method of claim 1, wherein the amount of carbon dioxide gas is maintained in the container for a period of 3–30 weeks.

19. A method for maintaining carbon dioxide gas in a container made of polyethylene terephthalate homopolymers or copolymers or poly(ethylene naphthalate) or copolymers, said carbon dioxide gas being present in the container in the range of 2 to 5 vol $CO_2$/vol $H_2O$, said container having an aqueous carbonated beverage having a pH in the range of about 2 to 4, said method comprising the step of blending an effective amount of a carbonic acid ester with said aqueous carbonated beverage for producing gaseous $CO_2$, said carbonic acid ester being present in an amount to constantly replenish $CO_2$ loss from said container at approximately the same rate of loss from said container.

20. A composition for maintaining carbon dioxide gas in an aqueous carbonated beverage in a container, comprising a carbonic acid ester and said aqueous carbonated beverage, said carbonic acid ester being present in an effective amount for producing gaseous $CO_2$ by hydrolysis of said carbonic acid ester, said carbonic acid ester being present in an amount to constantly replenish $CO_2$ loss from said container at approximately the same rate of loss from said container.

21. The composition of claim 20, wherein said carbonic acid ester is selected from the group consisting of 1,3-butylene carbonate, diethyl carbonate, neopenthylene carbonate and propylene carbonate and mixtures thereof.

22. The composition of claim 20, wherein said carbonic acid ester comprises 1,3-butylene carbonate.

23. The composition of claim 20, wherein said carbonic acid ester comprises diethyl carbonate.

24. The composition of claim 20, wherein said carbonic acid ester comprises neopentylene carbonate.

25. The composition of claim 20, wherein said carbonic acid ester comprises propylene carbonate.

26. The composition of claim 20, wherein the amount of carbonic acid ester is about 0.1 grams per liter to about 20 grams per liter.

27. The composition of claim 20, wherein the amount of carbon dioxide gas in the aqueous carbonated beverage is in the range of 2 to 5 vol $CO_2$/vol $H_2O$.

28. The composition of claim 27, wherein the amount of carbon dioxide gas in the aqueous carbonated beverage is in the range of 3.3. to 4.2 vol $CO_2$/vol $H_2O$.

29. The composition of claim 28, wherein the carbonated beverage is an aqueous solution having a pH of about 3.

30. The composition of claim 20, wherein the carbonated beverage is an aqueous solution having a pH in the range of about 2 to 4.

31. The composition of claim 30, wherein the amount of carbonic acid ester is about 2 grams per liter to about 5 grams per liter.

32. The composition of claim 20, wherein the amount of carbonic acid ester which is blended with said beverage does not increase the pressure in the container by more than about 5%.

33. The composition of claim 20, wherein the amount of carbonic acid ester maintains the amount of carbon dioxide gas in the container for a period which is about 50% longer than if said carbonic acid ester was not present.

34. The composition of claim 20, wherein the amount of carbonic acid ester maintains the amount of carbon dioxide gas in the container for a period which is about 33% longer than if said carbonic acid ester was not present.

35. The composition of claim 20, wherein the amount of carbon dioxide gas is maintained in the container for a period of 3–30 weeks.

* * * * *